United States Patent
Zhao et al.

(10) Patent No.: US 12,299,194 B2
(45) Date of Patent: May 13, 2025

(54) SYSTEMS AND METHODS FOR GAZE-ASSISTED GESTURE CONTROL

(71) Applicant: Meta Platforms Technologies, LLC, Menlo Park, CA (US)

(72) Inventors: Maozheng Zhao, Redmond, WA (US); Aakar Gupta, Redmond, WA (US); Tanya Renee Jonker, Seattle, WA (US); Hrvoje Benko, Seattle, WA (US); Alec Pierce, Portland, OR (US); Tianyi Wang, Redmond, WA (US); Ran Tan, Kirkland, WA (US); Ting Zhang, Santa Clara, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/421,678

(22) Filed: Jan. 24, 2024

(65) Prior Publication Data
US 2024/0256031 A1 Aug. 1, 2024

Related U.S. Application Data

(60) Provisional application No. 63/481,838, filed on Jan. 27, 2023.

(51) Int. Cl.
| | |
|---|---|
| *G06F 3/01* | (2006.01) |
| *G06F 3/0482* | (2013.01) |
| *G06F 3/04886* | (2022.01) |

(52) U.S. Cl.
CPC ............ *G06F 3/013* (2013.01); *G06F 3/0482* (2013.01); *G06F 3/04886* (2013.01)

(58) Field of Classification Search
CPC .... G06F 3/0312; G06F 3/03543; G06F 3/038; G06F 3/0485
See application file for complete search history.

(56) References Cited

U.S. PATENT DOCUMENTS

| | | | |
|---|---|---|---|
| 2018/0275753 A1* | 9/2018 | Publicover | G06F 3/04812 |
| 2023/0100689 A1* | 3/2023 | Chiu | G06F 3/04815 |
| | | | 345/157 |

* cited by examiner

*Primary Examiner* — Van N Chow
(74) *Attorney, Agent, or Firm* — Greenberg Traurig, LLP

(57) ABSTRACT

The disclosed computer-implemented method may include capturing, by a computing device, a current position of a wearable device and a current position of user eye gaze at a current time. The method may also include determining that a user eye gaze is at a fixation position based on a speed of gaze movement. Additionally, the method may include calculating a direction of cursor movement by comparing a current cursor position with a previous cursor position at a previous time. Furthermore, the method may include calculating a likelihood of the fixation position being a target cursor position based on a difference between the direction of cursor movement and a direction from the current cursor position to the fixation position. Finally, the method may include increasing a speed of cursor movement toward the fixation position based on the likelihood. Various other methods, systems, and computer-readable media are also disclosed.

20 Claims, 14 Drawing Sheets

SYSTEMS AND METHODS FOR GAZE-ASSISTED GESTURE CONTROL

CROSS REFERENCE TO RELATED APPLICATION

This application claims the benefit of U.S. Provisional Application No. 63/481,838, filed 27 Jan. 2023, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
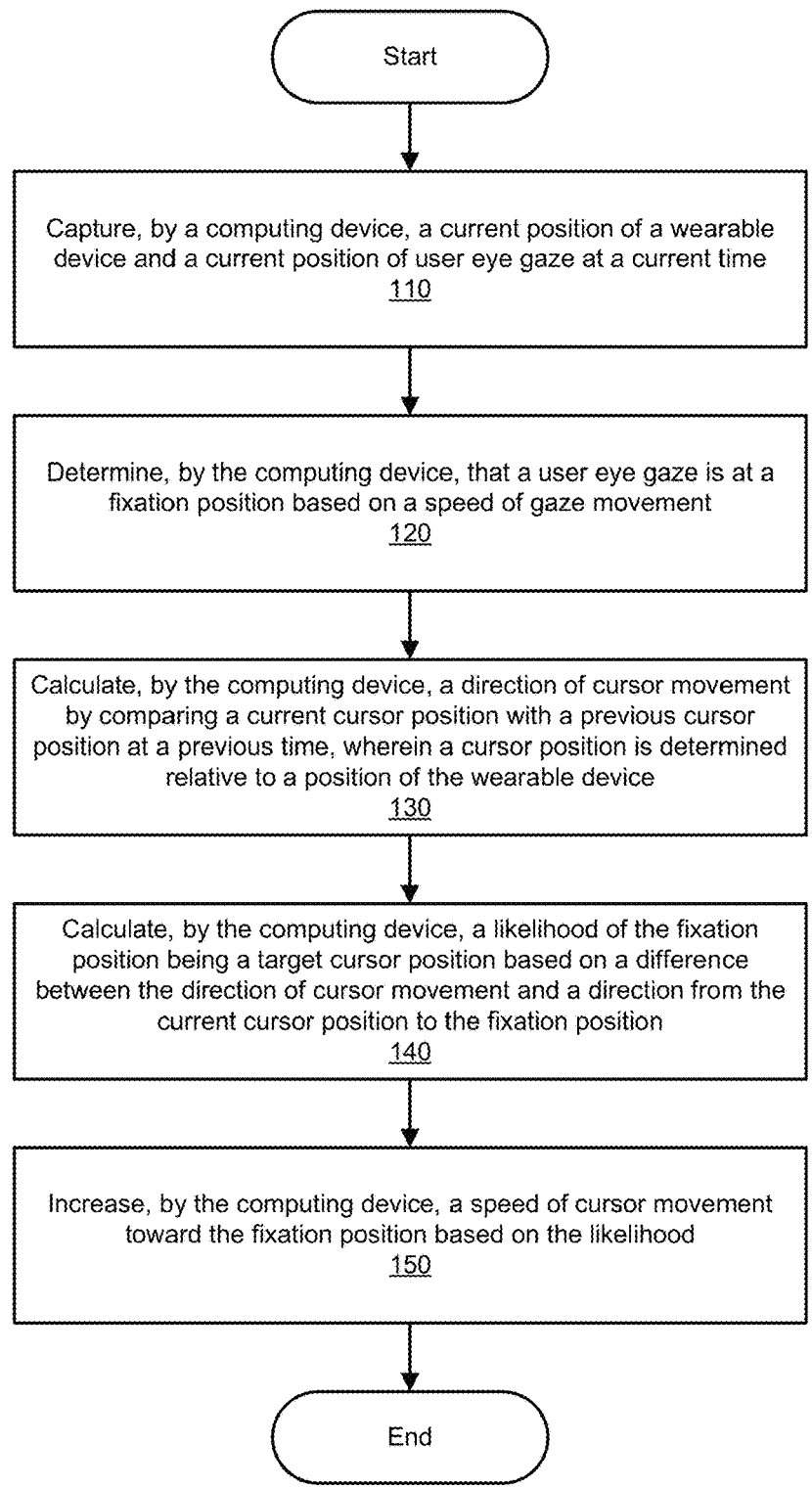
FIG. 1 is a flow diagram of an exemplary method for gaze-assisted gesture control.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

In augmented reality (AR) or virtual reality (VR) systems, user gestures may be tracked to serve as controls for the systems. For example, text input using hand gestures may be tracked through integrated cameras. However, vision-based hand tracking may require additional hardware and high computation power. As another example, hand gestures captured by wearing a wristband may indicate the position and movement of a cursor on a VR screen. By tracking gestures, these systems may implement virtual controls rather than relying on physical input like a traditional keyboard or mouse. For example, mid-air text input, such as gesture typing, enables users to perform gesture traces over virtual keyboard. Users may also be familiar with gesture typing as a virtual form of other common text inputs, such as swipe input common to smart phones. However, gesture tracking may include noisy or biased trajectories that impede the ability to quickly and accurately enter commands. For example, text input, in particular, may need accuracy for swipe input to ensure the correct words are predicted. Gesture tracking may also be inefficient, requiring precise movements, and may be slow to process. In addition, wearable devices like wristbands may cause further delays as signals from a wristband is transmitted to an AR or VR headset. These systems may provide poor visual feedback to users.

Some traditional methods of gesture input may use broader movements to increase accuracy. However, using broad movements to improve detection of precise hand movement may cause user arm fatigue. As users begin to feel fatigued, their movements may become slower and less precise. In contrast, some traditional systems may rely on eye gaze rather than hand gestures to simulate computing input. Although eye gaze tracking may be faster, it may also introduce additional errors. For example, tracking eye gaze may create a "Midas touch problem" wherein inadvertent eye movement inputs commands or activates controls that a user did not intend to activate, such as entering wrong keys during swipe typing. Other forms of input, such as text entry using head movement, may create similar problems of fatigue and inaccuracy. Thus, better methods of input and control are needed to reduce fatigue and improve the speed and accuracy of user input.

The present disclosure is generally directed to systems and methods for gaze-assisted gesture control. As will be explained in greater detail below, embodiments of the present disclosure may by combining gesture tracking and implicit eye gaze tracking, improve gesture controls in AR or VR systems. By tracking eye gaze to determine when a user fixates on a location, the systems and methods described herein may determine that the gaze position is likely to be the next target control. For example, the disclosed systems and methods may determine that a user gaze is fixated on the next input key of a virtual keyboard. The disclosed systems and methods may then track the direction of a cursor, as determined by a device tracking a gesture. For example, a user may wear a wrist-worn inertial motion unit (IMU) that tracks a hand gesture while the user wears an AR/VR headset showing a keyboard. The systems and methods disclosed herein may then move the cursor in a direction corresponding to the movement of the IMU.

Additionally, the disclosed systems and methods may speed up the cursor to reduce required physical movement. By using eye gaze to facilitate swipe input, the disclosed systems and methods may improve the speed of cursor trajectory. For example, the systems and methods described herein may determine that a wristband IMU is moving in the same direction as the eye gaze fixation. The disclosed systems and methods may then conclude that the fixation is a target of the user and speed up the cursor movement toward the fixation. Furthermore, the disclosed systems and methods may reduce cursor speed as it gets closer to the fixation position to ensure the user does not overshoot the intended target. For example, the systems and methods described herein may use a smoothing function to increase cursor speed toward the fixation position and then decrease cursor speed as the cursor approaches. Finally, the disclose systems and methods may provide word suggestions based on detecting a series of gaze fixations and cursor movement as swipe input.

In addition, the systems and methods described herein may improve the functioning of a computing device by combining gesture with assistance from eye gaze, where eye gaze is natural and implicit, to provide smoother and less biased visual feedback to users for gesture input. These systems and methods may also improve the fields of text input and AR and VR systems by improving the speed and accuracy of gesture input and reducing physical movement for a better user experience. Thus, the disclosed systems and methods may improve over traditional methods of AR and VR input by using eye gaze tracking to assist in gesture tracking for AR and VR gesture controls.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIG. 1, detailed descriptions of computer-implemented methods for gaze-assisted gesture control. Detailed descriptions of corresponding exemplary systems will be provided in connection with FIG. 2. Detailed descriptions of exemplary fixation positions based on exemplary user eye gaze will be provided in connection with FIG. 3. Detailed descriptions of exemplary determinations of exemplary fixation positions or exemplary saccade states will be provided in connection with FIG. 4. In addition, detailed descriptions of an exemplary adjustment of cursor speed based on distance to an exemplary fixation position will be provided in connection with FIG. 5. Detailed descriptions of exemplary traces of a cursor and a wearable device will be provided in connection with FIG. 6. Furthermore, detailed descriptions of exemplary augmented-reality glasses and an exemplary virtual-reality headset that may be used in connection with embodiments of this disclosure will be provided in connection with FIGS. 7-8. Detailed descriptions of an exemplary virtual-reality environment and an exemplary augmented-reality environment according to embodiments of this disclosure will be provided in connection with FIGS. 9-10. Additionally, detailed descriptions of exemplary eye-tracking subsystem will be provided in connection with FIGS. 11-12. Finally, detailed descriptions of exemplary wearable systems will be provided in connection with FIGS. 13A-13B and FIGS. 14A-14B.

FIG. 1 is a flow diagram of an exemplary computer-implemented method 100 for gaze-assisted gesture control. The steps shown in FIG. 1 maybe performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

Figure 2:
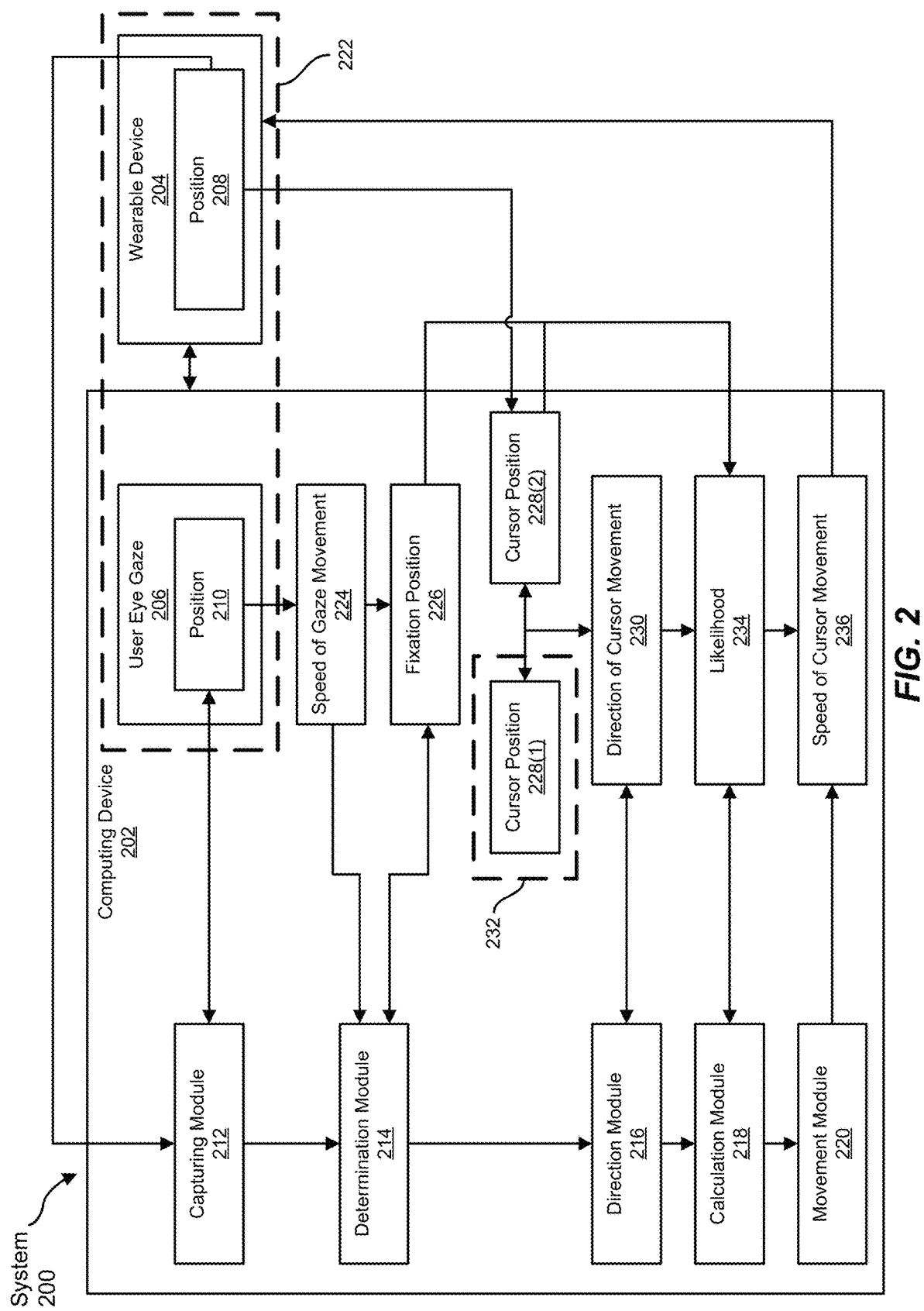
FIG. 2 is a block diagram of an exemplary system for gaze-assisted gesture control.

As illustrated in FIG. 1, at step 110 one or more of the systems described herein may capture, by a computing device, a current position of a wearable device and a current position of user eye gaze at a current time. For example, FIG. 2 is a block diagram of an exemplary system 200 for gaze-assisted gesture control. As illustrated in FIG. 2, a capturing module 212 may as part of a computing device 202, capture a position 208 of a wearable device 204 and a position 210 of user eye gaze 206 at a current time 222.

The systems described herein may perform step 110 in a variety of ways. In one example, computing device 202 of FIG. 2 may generally represent any type or form of computing device or server that may be programmed with the modules of FIG. 2 and/or may store all or a portion of the data described herein. For example, computing device 202 may represent a client device capable of generating an AR or VR environment. In this example, computing device 202 may be programmed with the modules of FIG. 2 as part of an AR or VR system and may be capable of reading computer-executable instructions. As another example, computing device 202 may represent a server that is capable of receiving, storing, and/or processing AR or VR data for other computing devices, such as wearable device 204. Examples of computing devices may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. Additional examples of computing devices may include, without limitation, application servers and database servers configured to provide various database services and/or run certain software applications, such as communication and data transmission services. In particular, computing device 202 may represent augmented-reality system 700 in FIG. 7 and/or virtual-reality system 800 in FIG. 8.

Figure 9:
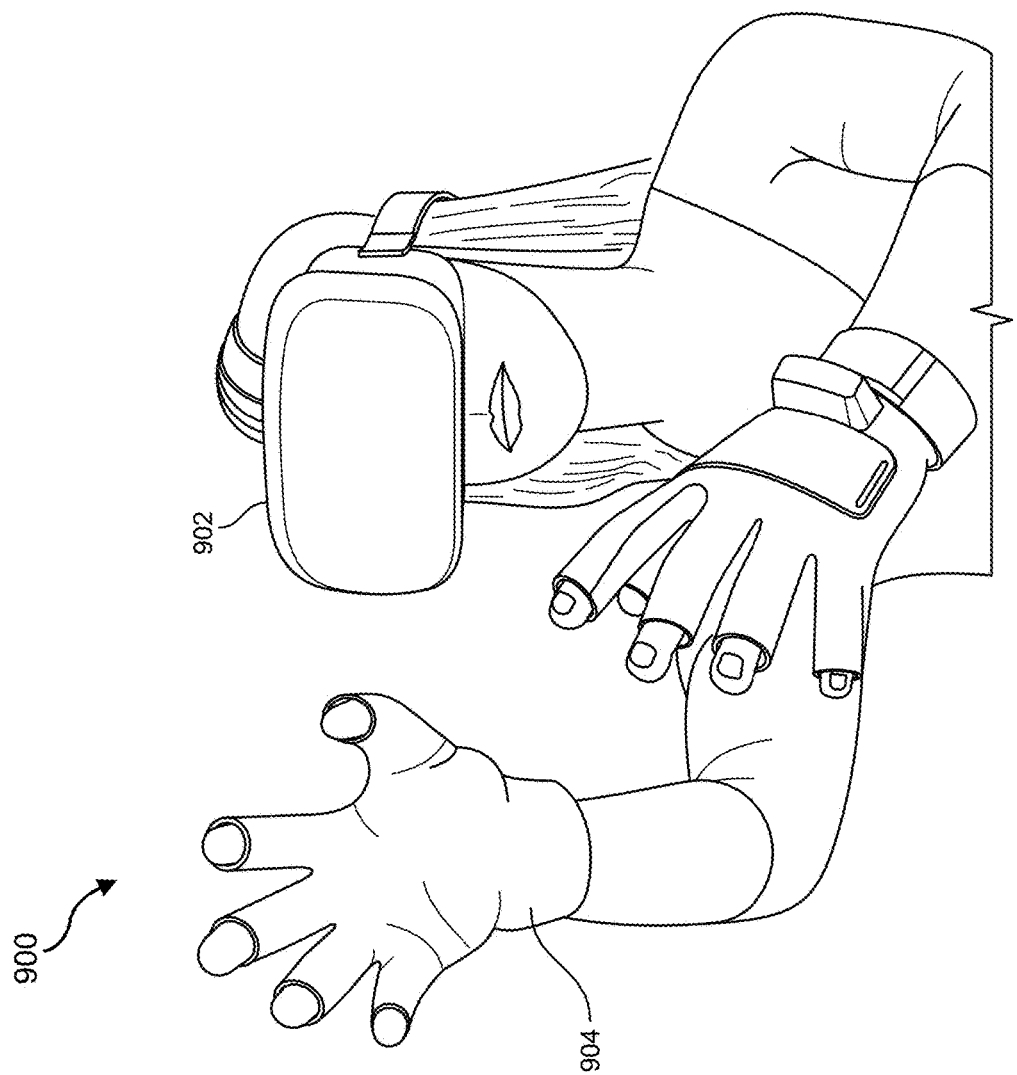
FIG. 9 is an illustration of an exemplary virtual-reality environment according to embodiments of this disclosure.
Figure 10:
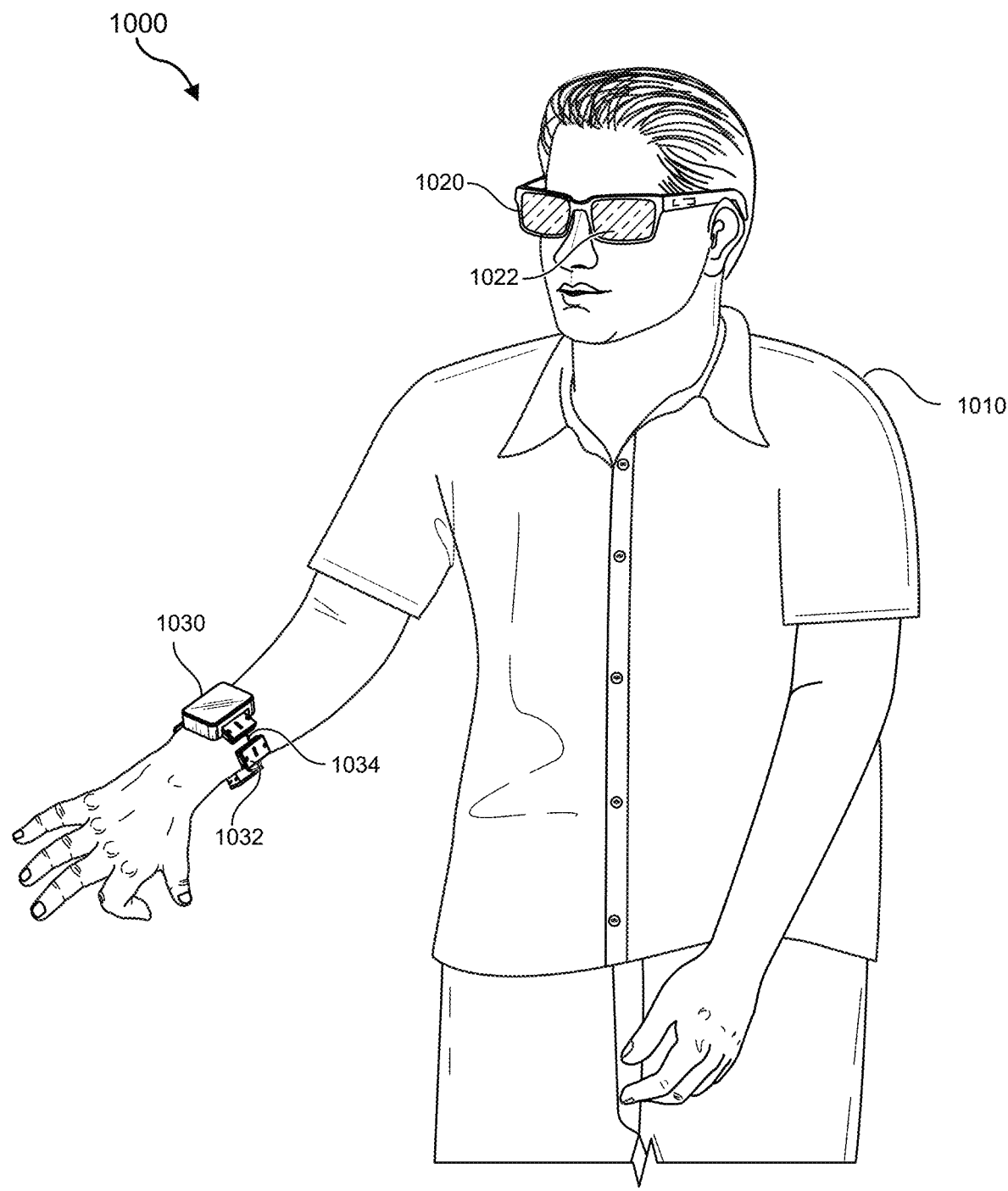
FIG. 10 is an illustration of an exemplary augmented-reality environment according to embodiments of this disclosure.

In some examples, system 200 may represent all or a portion of artificial reality environment 900 of FIG. 9 and/or augmented-reality system 1000 of FIG. 10. Additionally, system 200 may represent or incorporate all or a portion of system 1100 of FIG. 11 and/or eye-tracking subsystem 1200 of FIG. 12. In some examples, wearable device 204 may represent wearable device 904 of FIG. 9, wearable device 1030 of FIG. 10, wearable system 1300 of FIG. 13A, the wearable system of FIGS. 14A and 14B, and/or any other suitable computing device for tracking gestures. For example, wearable device 204 may be a wristband with an inertial motion unit (IMU) for tracking hand gestures. In some examples, system 200 may include a single wearable device for gesture tracking. In other examples, system 200 may include multiple wearable devices for two-handed gesture tracking and/or other types of controllers or devices for user input, such as a ring IMU or a handheld controller. In these examples, a user may wear two or more devices that track various movements for additional inputs or improved sensors. In some examples, wearable device 204 may communicate with computing device 202 with a wired and/or wireless network connection.

In some embodiments, capturing module 212 may capture position 208 of wearable device 204 by receiving a set of coordinates of wearable device 204 at periodic intervals. In these embodiments, the set of coordinates may represent coordinates in a three-dimensional space of a virtual environment. In some embodiments, the set of coordinates may represent a geolocation of a user wearing computing device 202 and/or a relative location between wearable device 204 and computing device 202. In one example, wearable device 204 may periodically send the set of coordinates to computing device 202. In this example, wearable device 204 may sent updated coordinates at each timestamp.

In some examples, the periodic intervals may coincide with updates of eye tracking for user eye gaze 206. In other examples, the periodic intervals for updates from wearable device 204 may be different from updates for eye tracking. In some examples, user eye gaze 206 may be tracked by system 1100 of FIG. 11 and/or eye-tracking subsystem 1200 of FIG. 12, which may be integrated with an AR/VR device worn by the user.

Returning to FIG. 1, at step 120, one or more of the systems described herein may determine, by the computing device, that a user eye gaze is at a fixation position based on a speed of gaze movement. For example, a determination module 214 may as part of computing device 202 of FIG. 2, determine that user eye gaze 206 is at a fixation position 226 based on a speed of gaze movement 224.

The systems described herein may perform step 120 in a variety of ways. In some examples, fixation position 226 may represent a steady state of user eye gaze 206. In some examples, fixation position 226 may indicate a key on a virtual keyboard. In these examples, the user may use the virtual keyboard to provide text input for a virtual environment, with wearable device 204 using gesture to manipulate a cursor to select keys. In these examples, the user may use a hand wearing wearable device 204 for mid-air typing. In these examples, eye tracking data may indicate a user's intention to select a key before moving to actually select the key.

Figure 3:
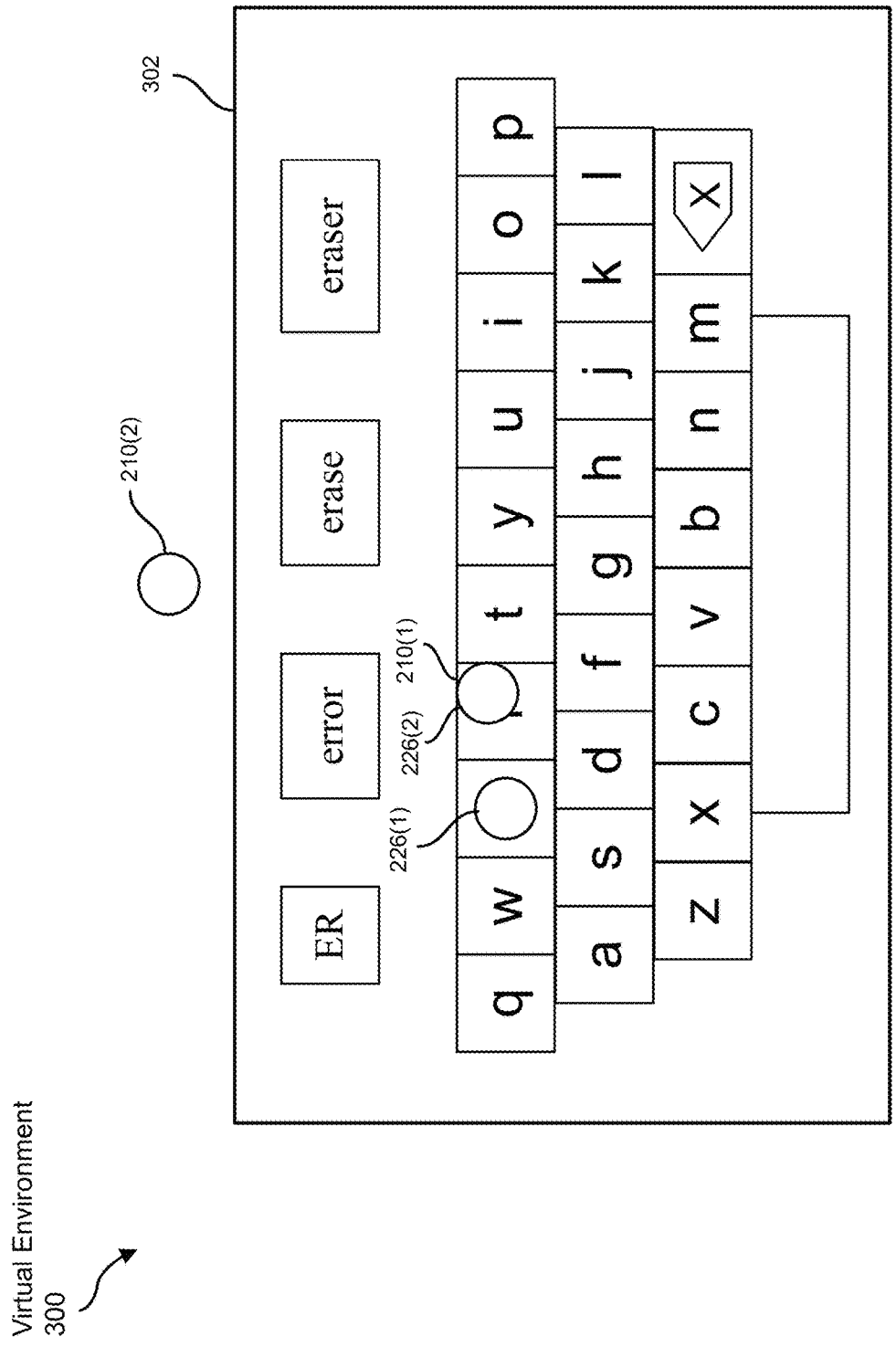
FIG. 3 is an illustration of exemplary fixation positions based on exemplary user eye gaze.

In one embodiment, determination module 214 may determine a current position of user eye gaze 206 is more than a size of a key away from a previous fixation position. In this embodiment, determination module 214 may detect a new fixation position based on the current position of user eye gaze 206. In the example of FIG. 3, a virtual keyboard 302 may include a multitude of keys in a QWERTY formation within a virtual environment 300. In this example, a user may see virtual environment 300 while wearing computing device 202. In this example, determination module 214 may determine a position 210(1) of user eye gaze 206 is more than a size of a key away from a fixation position 226(1) and may then set position 210(1) as a new fixation position 226(2). In other words, even if speed of gaze movement 224 is low, a substantial movement away from fixation position 226(1) may indicate a new fixation.

In some examples, determination module 214 may determine the current position of user eye gaze is outside a range of the virtual keyboard, discarding the current position of user eye gaze, and/or set the fixation position to the previous fixation position. In the example of FIG. 3, determination module 214 may determine a position 210(2) of user eye gaze 206 is outside the range of virtual keyboard 302. In this example, determination module 214 may then discard or ignore position 210(2) and set the fixation position to fixation position 226(2) rather than designation position 210(2) as a new fixation position. In other words, computing device 202 may continue to use fixation position 226(2) until a new valid fixation position is detected, wherein a user eye gaze outside of the input area is considered invalid. In these examples, user eye gaze 206 may be expected to move ahead of a cursor such that the user looks at the next key before guiding wearable device 204 toward the location of the key. In these examples, user eye gaze 206 may move to multiple next keys or venture outside of virtual keyboard 302, and the impact of user eye gaze 206 may be proportionally determined based on a likelihood that user eye gaze 206 is the next target input.

In some embodiments, speed of gaze movement 224 may be calculated by comparing the current position of user eye gaze 206 to a previous position of user eye gaze 206 at a previous time. In the example of FIG. 3, speed of gaze movement 224 may be calculated by dividing the distance between position 210(1) and position 210(2) by a periodic interval between the time of detection of positions 210(1)-(2). In some embodiments, determination module 214 may determine that user eye gaze 206 is at fixation position 226 by determining that speed of gaze movement 224 is below a predetermined threshold, determining that speed of gaze movement 224 remains below the predetermined threshold for a predetermined period of time, and setting fixation position 226 to position 210 of user eye gaze 206 of FIG. 2. In other words, a gaze at a specific location for an extended period of time may be considered a fixation state. In some examples, fixation position 226 may be the first gaze position detected within range after the predetermined period of time has passed. In other examples, fixation position 226 may be an average of multiple gaze positions during the predetermined period of time to ensure less unintentional variation. In some examples, the predetermined threshold may be based on user data from previous user inputs and/or test data indicating when user eye gaze 206 is likely fixated.

In some embodiments, determination module 214 may determine that user eye gaze 206 is in a saccade state based on determining that speed of gaze movement 224 is not below the predetermined threshold. In these embodiments, computing device 202 may maintain fixation position 226 until a new fixation position is detected. As used herein, the term "saccade" may generally refer to rapid eye movement that shift between positions. In some embodiments, determination module 214 may determine user eye gaze 206 is in the saccade state after multiple time periods of movement above the predetermined threshold to reduce detection of unintentional eye movement.

Figure 4:
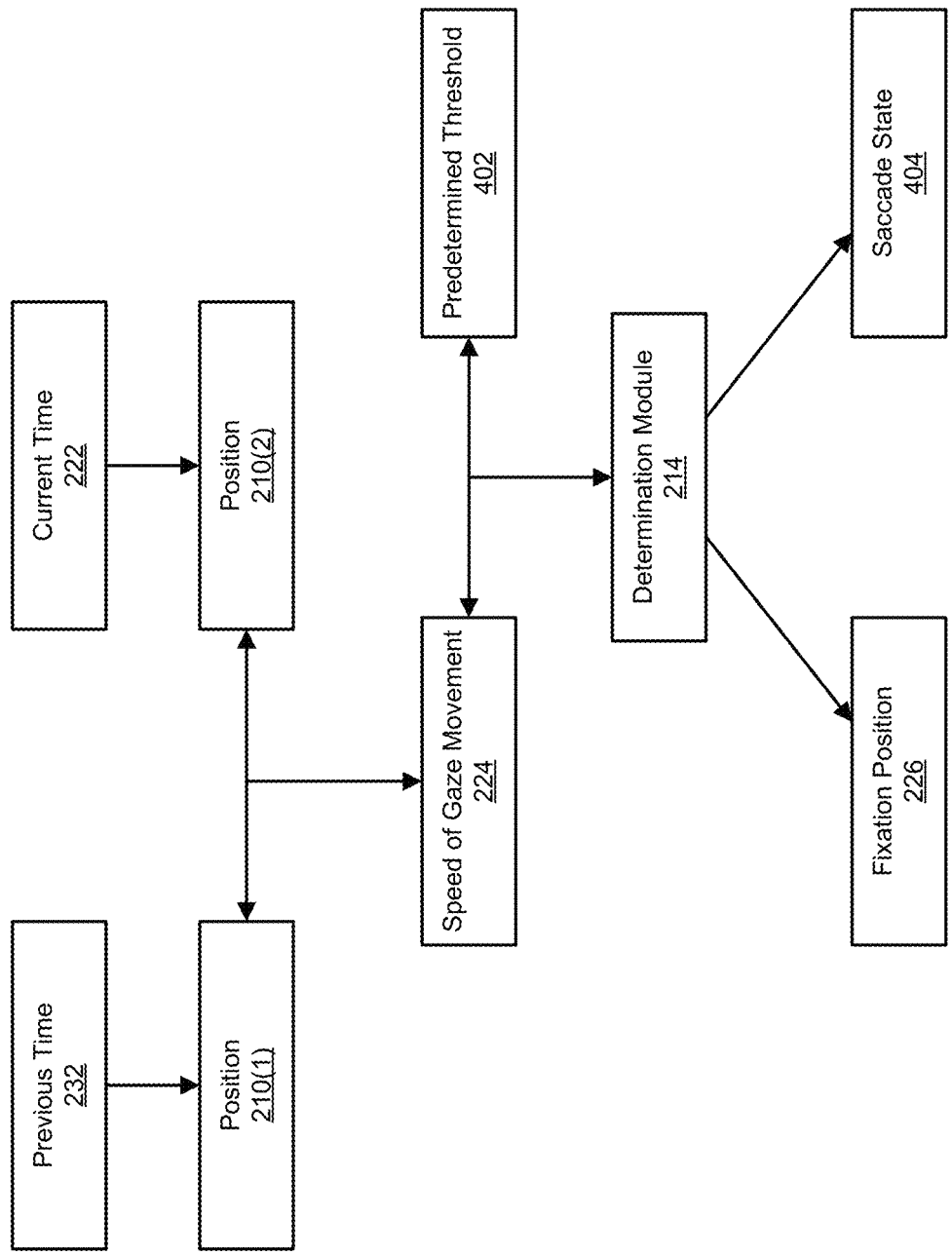
FIG. 4 is a block diagram of an exemplary determination of an exemplary fixation position or an exemplary saccade state.

As shown in FIG. 4, speed of gaze movement 224 may be calculated based on position 210(1) of user eye gaze 206 at a previous time 232 and position 210(2) at current time 222. In this example, determination module 214 may then compare speed of gaze movement 224 with a predetermined threshold 402 to determine whether user eye gaze 206 is at a saccade state 404 or whether fixation position 226 may be set to position 210(2). In this example, determination module 214 may determine that user eye gaze 206 moves from saccade state 404 to a fixation state when user eye gaze 206 does not change significantly, as determined by a low speed of gaze movement 224.

Returning to FIG. 1, at step 130, one or more of the systems described herein may calculate, by the computing device, a direction of cursor movement by comparing a current cursor position with a previous cursor position at a previous time, wherein a cursor position is determined relative to a position of the wearable device. For example, a direction module 216 may as part of computing device 202 of FIG. 2, calculate a direction of cursor movement 230 by comparing a current cursor position 228(2) with a previous cursor position 228(1) at previous time 232, wherein cursor position 228(2) is determined relative to position 208 of wearable device 204.

The systems described herein may perform step 130 in a variety of ways. In some examples, the term "cursor" may generally refer to a visual element in a computing display used to indicate a position within the display. In some examples, cursor position 228(1) and cursor position 228(2) may be based on the positions and movement of wearable device 204. For example, after detecting movement and a change in position 208 of wearable device 204, the cursor may move in the same direction from cursor position 228(1) to arrive at cursor position 228(2). In other words, wearable device 204 may control the cursor within virtual environment 300, and direction of cursor movement 230 may be the same as a direction of movement of wearable device 204.

In some embodiments, direction module 216 may calculate direction of cursor movement 230 using a set of coordinates for cursor position 228(1) and a set of coordinates for cursor position 228(2). In some examples, direction module 216 may calculate direction of cursor movement 230 in two-dimensional space, such as along the surface of virtual keyboard 302. In additional examples, direction module 216 may calculate direction of cursor movement 230 in three-dimensional space to account for additional movement and speed toward or away from virtual keyboard 302. Furthermore, direction module 216 may implement a smoothing function to calculate direction of cursor movement 230 based on multiple previous cursor positions to ensure a more intentional movement.

Returning to FIG. 1, at step 140, one or more of the systems described herein may calculate, by the computing device, a likelihood of the fixation position being a target cursor position based on a difference between the direction of cursor movement and a direction from the current cursor position to the fixation position. For example, a calculation module 218 may as part of computing device 202 of FIG. 2, calculate a likelihood 234 of fixation position 226 being a target cursor position based on a difference between direction of cursor movement 230 and a direction from current cursor position 228(2) to fixation position 226.

The systems described herein may perform step 140 in a variety of ways. In some examples, calculation module 218 may calculate the difference between direction of cursor movement 230 and the direction from cursor position 228(2) to fixation position 226 by calculating an angle between direction of cursor movement 230 and the direction between cursor position 228(2) and fixation position 226. In these examples, a smaller angle may indicate direction of cursor movement 230 is toward fixation position 226, which may indicate a higher likelihood 234 that the cursor is moving to follow user eye gaze 206, such as toward a specific key on virtual keyboard 302. In contrast, a larger angle may indicate direction of cursor movement 230 is not toward fixation position 226, which may indicate the cursor is moving toward a different location and/or not intentionally being moved for text input. In other examples, calculation module 218 may calculate likelihood 234 with alternate methods, such as based on distance from cursor position 228(2) to fixation position 226, historical movement of the cursor compared to user eye gaze 206, and/or any other suitable methods.

Returning to FIG. 1, at step 150, one or more of the systems described herein may increase, by the computing device, a speed of cursor movement toward the fixation position based on the likelihood. For example, a movement module 220 may as part of computing device 202 of FIG. 2, increase a speed of cursor movement 236 toward fixation position 226 based on likelihood 234.

The systems described herein may perform step 150 in a variety of ways. In some examples, if likelihood 234 is high, movement module 220 may increase speed of cursor movement 236 to move faster toward fixation position 226. In these examples, if likelihood 234 is low, movement module 220 may not increase speed of cursor movement 236 or may only slightly increase speed of cursor movement 236. In some examples, movement module 220 may increase speed of cursor movement 236 only in the direction of fixation position 226 and not overall speed or speed in perpendicular directions. In other words, if likelihood 234 is high that the cursor is following user eye gaze 206, movement module 220 may predict fixation position 226 is the next input key and reduce physical movement needed for the cursor to reach fixation position 226, thus using eye gaze to assist gesture control.

In one embodiment, speed of cursor movement 236 may be calculated by comparing current cursor position 228(2) to previous cursor position 228(1) at previous time 232. In this embodiment, cursor position may be updated at periodic intervals based on the updates from wearable device 204, and speed of cursor movement 236 may represent a distance between cursor position 228(1) and cursor position 228(2) divided by a periodic interval. For example, wearable device 204 may update at a rate of 50 Hz, and a vector of speed and direction may be calculated from coordinates updates of wearable device 204 to move the cursor from cursor position 228(1) to cursor position 228(2). In some embodiments, at each timestamp, movement module 220 may determine if user eye gaze 206 is in saccade state 404. In these embodiments, when the state of user eye gaze 206 changes from a fixation state to saccade state 404, computing device 202 may continue to move the cursor toward fixation position 226 at an increased speed. Additionally, when the state of user eye gaze 206 changes back to a fixation state, computing device 202 may calculate a new fixation position and determine if the cursor has reached previous fixation position 226. In some embodiments, while the cursor continues to move toward fixation position 226, movement module 220 may continue to increase speed of cursor movement 236. In these embodiments, if the cursor changes direction toward the new fixation position, movement module 220 may begin to increase speed of cursor movement 236 in the new direction toward the new fixation position.

In some examples, the disclosed systems and methods may further include decreasing speed of cursor movement 236 relative to a decrease in a distance between current cursor position 228(2) and fixation position 226. With higher speeds, there may be an increased likelihood of overshooting a target input, and the user may find it harder to maintain precise cursor control near the target. In these examples, the decrease in speed of cursor movement 236 may reduce the likelihood of overshooting the target as the cursor nears the target. For example, by using a Gaussian function to adjust the increase to speed of cursor movement 236 toward fixation position 226, movement module 220 may smoothly and gradually increase speed of cursor movement 236 initially, reach a maximum speed midway between the original cursor position and fixation position 226, and then smoothly decrease speed of cursor movement 236 as the cursor approaches fixation position 226. In some examples, the term "Gaussian function" may generally refer to a bell curve shaped function. In these examples, the variable increase in speed of cursor movement 236 may improve precision control near fixation position 226 while maintaining a faster speed away from fixation position 226.

In some examples, the disclosed systems and methods may further include determining current cursor position 228(2) is within a predetermined proximity of fixation position 226 and, subsequently, reducing speed of cursor movement 236 to a base cursor speed. In other words, within a radius of fixation position 226, movement module 220 may reduce speed of cursor movement 236 to further reduce the likelihood of overshooting the intended target.

Figure 5:
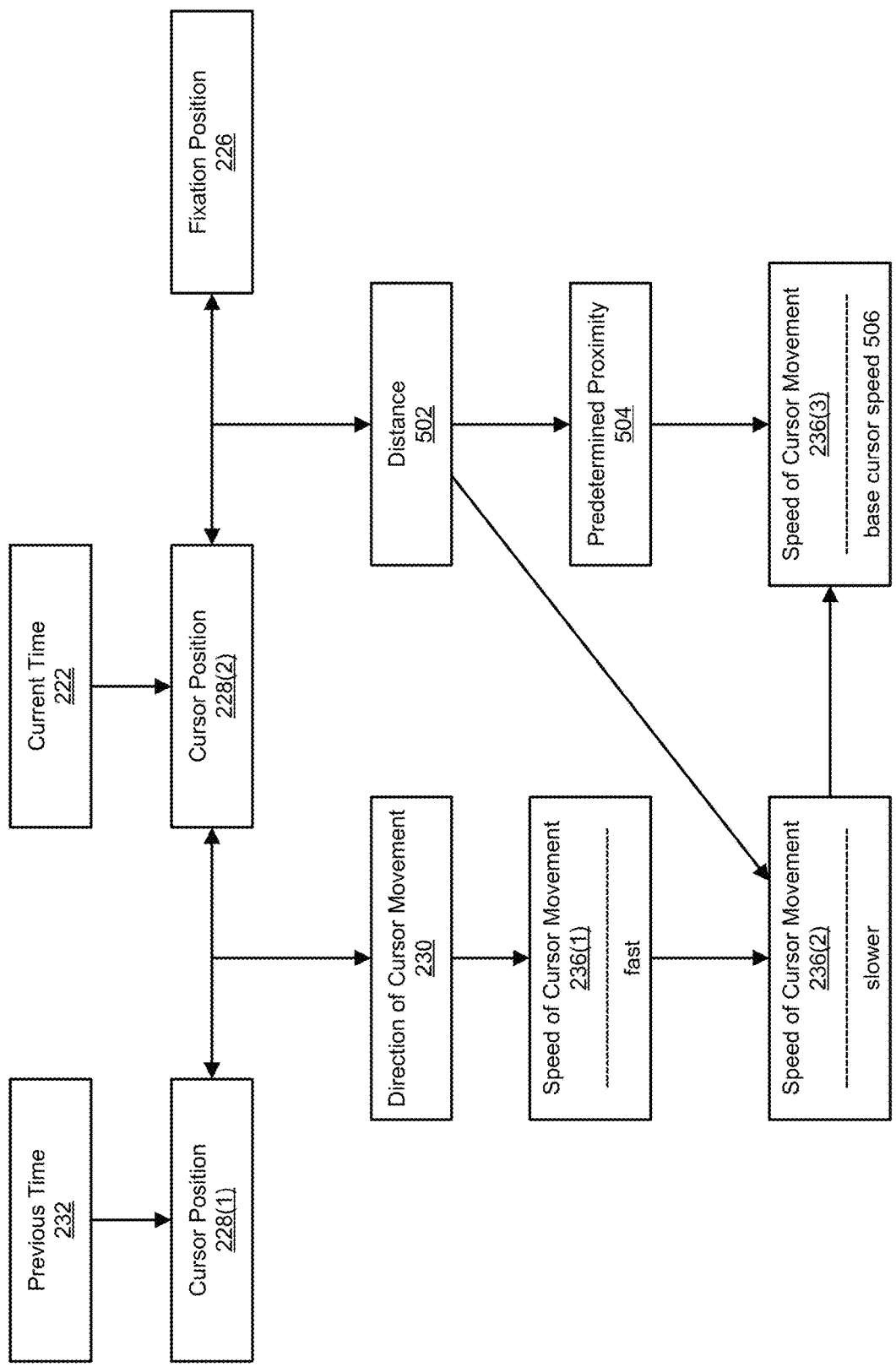
FIG. 5 is a block diagram of an exemplary adjustment of cursor speed based on distance to an exemplary fixation position.

As shown in FIG. 5, direction of cursor movement 230 may be calculated based on cursor position 228(1) at previous time 232 and cursor position 228(2) at current time 222. In this example, a speed of cursor movement 236(1) may be increased to a fast speed based on determining direction of cursor movement 230 is toward fixation position 226. In this example, as a distance 502 between the cursor and fixation position 226 decreases, a new speed of cursor movement 236(2) may be set to a slower speed, with less increase, and may continue to slow. Subsequently, when the cursor reaches a predetermined proximity 504 of fixation position 226, a speed of cursor movement 236(3) may reach a base cursor speed 506. In some examples, base cursor speed 506 may be slower than a standard cursor speed to ensure additional control of the cursor as it nears fixation position 226.

In some embodiments, the disclosed systems and methods may alternatively use other types of functions to provide a smooth increase and decrease in speed of cursor movement 236. For example, speed of cursor movement 236 may be greatest closer to the initial cursor position and/or skewed toward fixation position 226. As another example, speed of cursor movement 236 may increase to a steady fast speed until approaching predetermined proximity 504 of fixation position 226. In other embodiments, the disclosed systems and methods may use a flat increase to speed of cursor movement 236, which may be balanced between higher speeds and more precision. In some embodiments, the disclosed systems and methods may implement biomechanical constraints or other forms of movement control to further stabilize the output of wearable device 204 to reduce drift.

In some examples, the disclosed systems and methods may further include generating a list of suggested words based on a set of recent fixation positions, displaying the list of suggested words in virtual environment 300, and/or detecting a selection of a suggested word.

Figure 6:
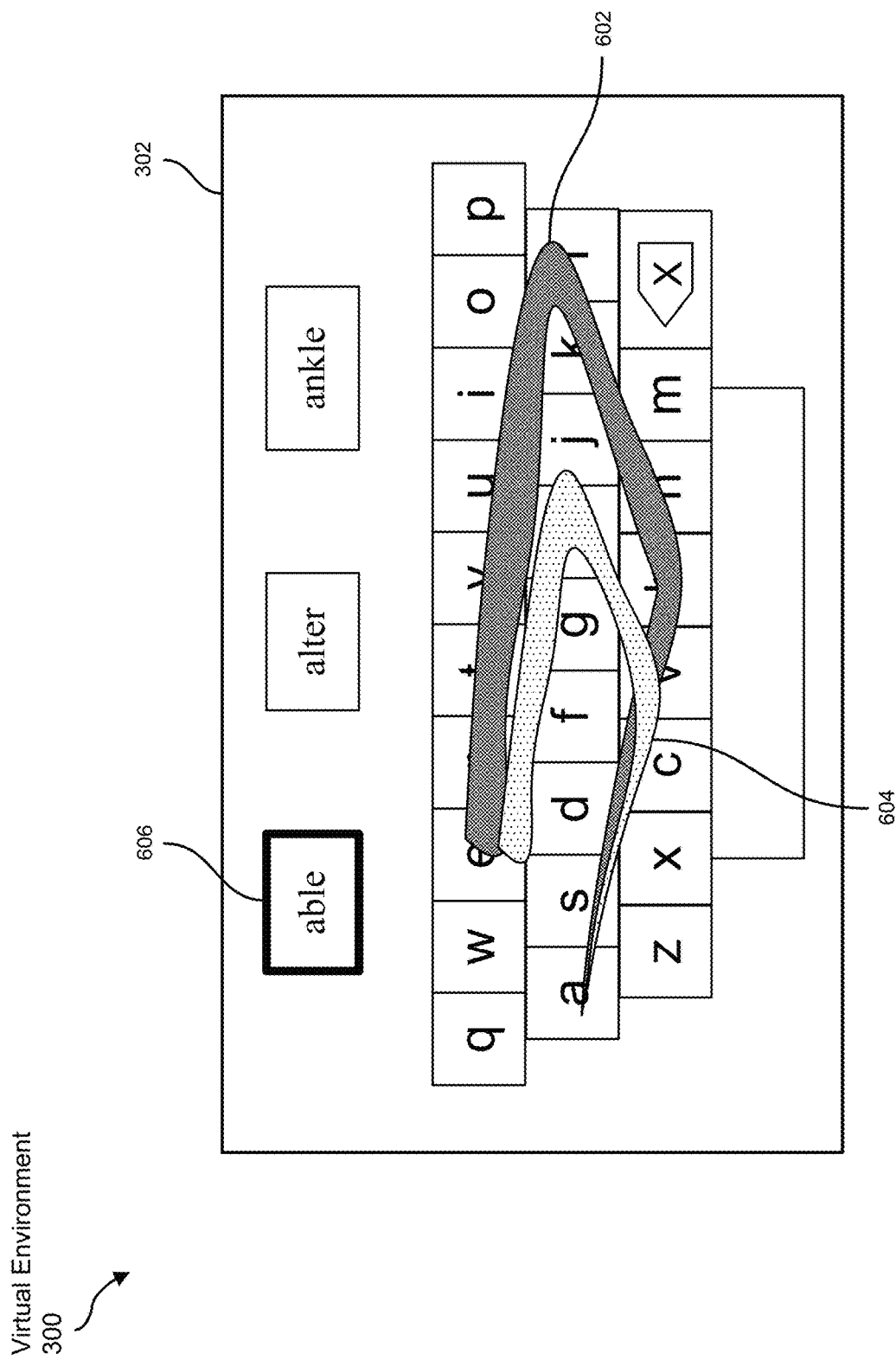
FIG. 6 is an illustration of exemplary traces of a cursor and a wearable device.

In the example of FIG. 3, virtual environment 300 may display a list of suggested words beginning with the letters "e" and "r" based on detecting a change from fixation position 226(1) to fixation position 226(2). As shown in FIG. 6, virtual environment 300 may display a list of suggested words based on a swipe pattern on virtual keyboard 302. In this example, a selection 606 (e.g., "able") by the user may be detected based on additional movement of user eye gaze 206 and/or a control input. In this example, a trace of cursor positions 602 may represent the movement of the cursor, and a trace of wearable device 604 may indicate the equivalent movement of wearable device 204. As shown in this example, the increased speed of the cursor may reduce the total movement of wearable device 204 in comparison to movement needed without increasing the speed, thus lowering the physical demand while increasing the speed of text input.

In additional examples, the disclosed systems and methods may detect the deletion of letters and/or a selection of other input options, such as an "enter" key or menu selections. In the above examples, the reduced hand movement may also decrease an error rate in key selection, which may reduce the deletion of letters. In further examples, the disclosed systems and methods may be applied to other forms of design to derive frequency responses.

As explained above in connection with method 100 in FIG. 1, the disclosed systems and methods may by using implicit eye gaze tracking to assist gesture control, decrease gesture movement and increase speed and accuracy. Specifically, the disclosed systems and methods may first track eye gaze to determine when a user fixates on a specific location, such as a key on a virtual keyboard. This fixation position may indicate a potential next input or command. If eye gaze moves too quickly, the disclosed systems and methods may determine that there is no fixation position yet. The disclosed systems and methods may then track the direction of a cursor, as determined by a device tracking a gesture. For example, a user may wear a wristband that tracks a hand gesture while the user wears an AR/VR headset displaying a keyboard. In this example, hand gestures may control the movement and selection of the cursor.

Subsequently, the disclosed systems and methods may calculate the likelihood that the direction of the cursor is moving toward the fixation position of the eye gaze, specifically by calculating an angle between the cursor movement direction and the direction between the cursor and the fixation position. If the likelihood is high, based on a smaller angle, the systems and methods described herein may increase the speed of the cursor toward the fixation position. In the example of swipe typing, the cursor may reach the next key faster and may reduce the amount of movement that the user has to make. Additionally, the disclosed systems and methods may decrease the cursor speed as the cursor nears the fixation position. For example, decreasing cursor speed may reduce the likelihood of the user overshooting the fixation position, thereby reducing input error. Thus, the systems and methods described herein may improve over traditional methods of gesture control by augmenting gesture tracking with eye gaze tracking.

- Example 1: A computer-implemented method for gaze-assisted gesture control may include 1) capturing, by a computing device, a current position of a wearable device and a current position of user eye gaze at a current time, 2) determining, by the computing device, that a user eye gaze is at a fixation position based on a speed of gaze movement, 3) calculating, by the computing device, a direction of cursor movement by comparing a current cursor position with a previous cursor position at a previous time, wherein a cursor position is determined relative to a position of the wearable device, 4) calculating, by the computing device, a likelihood of the fixation position being a target cursor position based on a difference between the direction of cursor movement and a direction from the current cursor position to the fixation position, and 5) increasing, by the computing device, a speed of cursor movement toward the fixation position based on the likelihood.
- Example 2: The computer-implemented method of Example 1, wherein capturing the current position of the wearable device may include receiving a set of coordinates of the wearable device at periodic intervals.
- Example 3: The computer-implemented method of any of Examples 1 and 2, wherein the fixation position may indicate a key on a virtual keyboard.
- Example 4: The computer-implemented method of Example 3 may further include determining the current position of user eye gaze is more than a size of the key away from a previous fixation position and detecting a new fixation position based on the current position of user eye gaze.
- Example 5: The computer-implemented method of Example 4 may further include determining the current position of user eye gaze is outside a range of the virtual keyboard, discarding the current position of user eye gaze, and setting the fixation position to the previous fixation position.

Example 6: The computer-implemented method of any of Examples 1-5, wherein the speed of gaze movement may be calculated by comparing the current position of user eye gaze to a previous position of user eye gaze at the previous time.

Example 7: The computer-implemented method of any of Examples 1-6, wherein determining that the user eye gaze is at the fixation position may include determining that the speed of gaze movement is below a predetermined threshold, determining that the speed of gaze movement remains below the predetermined threshold for a predetermined period of time, and setting the fixation position to the current position of user eye gaze.

Example 8: The computer-implemented method of Example 7 may further include 1) determining that the user eye gaze is in a saccade state based on determining that the speed of gaze movement is not below the predetermined threshold and 2) maintaining the fixation position until a new fixation position is detected.

Example 9: The computer-implemented method of any of Examples 1-8, wherein the speed of cursor movement may be calculated by comparing the current cursor position to the previous cursor position at the previous time.

Example 10: The computer-implemented method of any of Examples 1-9 may further include decreasing the speed of cursor movement relative to a decrease in a distance between the current cursor position and the fixation position.

Example 11: The computer-implemented method of any of Examples 1-10 may further include determining the current cursor position is within a predetermined proximity of the fixation position and reducing the speed of cursor movement to a base cursor speed.

Example 12: The computer-implemented method of any of Examples 1-11 may further include generating a list of suggested words based on a set of recent fixation positions, displaying the list of suggested words in a virtual environment, and detecting a selection of a suggested word.

Example 13: A corresponding system for gaze-assisted gesture control may include several modules store in memory, including 1) a capturing module that captures, by a computing device, a current position of a wearable device and a current position of user eye gaze at a current time, 2) a determination module that determines, by the computing device, that a user eye gaze is at a fixation position based on a speed of gaze movement, 3) a direction module that calculates, by the computing device, a direction of cursor movement by comparing a current cursor position with a previous cursor position at a previous time, wherein a cursor position is determined relative to a position of the wearable device, 4) a calculation module that calculates, by the computing device, a likelihood of the fixation position being a target cursor position based on a difference between the direction of cursor movement and a direction from the current cursor position to the fixation position, and 5) a movement module that increases, by the computing device, a speed of cursor movement toward the fixation position based on the likelihood. The system may also include one or more hardware processors that execute the capturing module, the determination module, the direction module, the calculation module, and the movement module.

Example 14: The system of Example 13, wherein the capturing module may capture the current position of the wearable device by receiving a set of coordinates of the wearable device at periodic intervals.

Example 15: The system of any of Examples 13 and 14, wherein the fixation position may indicate a key on a virtual keyboard.

Example 16: The system of Example 15, wherein the determination module may further 1) determine the current position of user eye gaze is more than a size of the key away from a previous fixation position and 2) detect a new fixation position based on the current position of user eye gaze.

Example 17: The system of Example 16, wherein the determination module may further determine the current position of user eye gaze is outside a range of the virtual keyboard, discard the current position of user eye gaze, and set the fixation position to the previous fixation position.

Example 18: The system of any of Examples 13-17, wherein the speed of gaze movement may be calculated by comparing the current position of user eye gaze to a previous position of user eye gaze at the previous time.

Example 19: The system of any of Examples 13-18, wherein the determination module may determine that the user eye gaze is at the fixation position by determining that the speed of gaze movement is below a predetermined threshold, determining that the speed of gaze movement remains below the predetermined threshold for a predetermined period of time, and setting the fixation position to the current position of user eye gaze.

Example 20: The above-described method may be encoded as computer-readable instructions on a computer-readable medium. For example, a non-transitory computer-readable medium may include one or more computer-executable instructions that, when executed by one or more processors of a computing device, may cause the computing device to 1) capture a current position of a wearable device and a current position of user eye gaze at a current time, 2) determine that a user eye gaze is at a fixation position based on a speed of gaze movement, 3) calculate a direction of cursor movement by comparing a current cursor position with a previous cursor position at a previous time, wherein a cursor position is determined relative to a position of the wearable device, 4) calculate a likelihood of the fixation position being a target cursor position based on a difference between the direction of cursor movement and a direction from the current cursor position to the fixation position, and 5) increase a speed of cursor movement toward the fixation position based on the likelihood.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
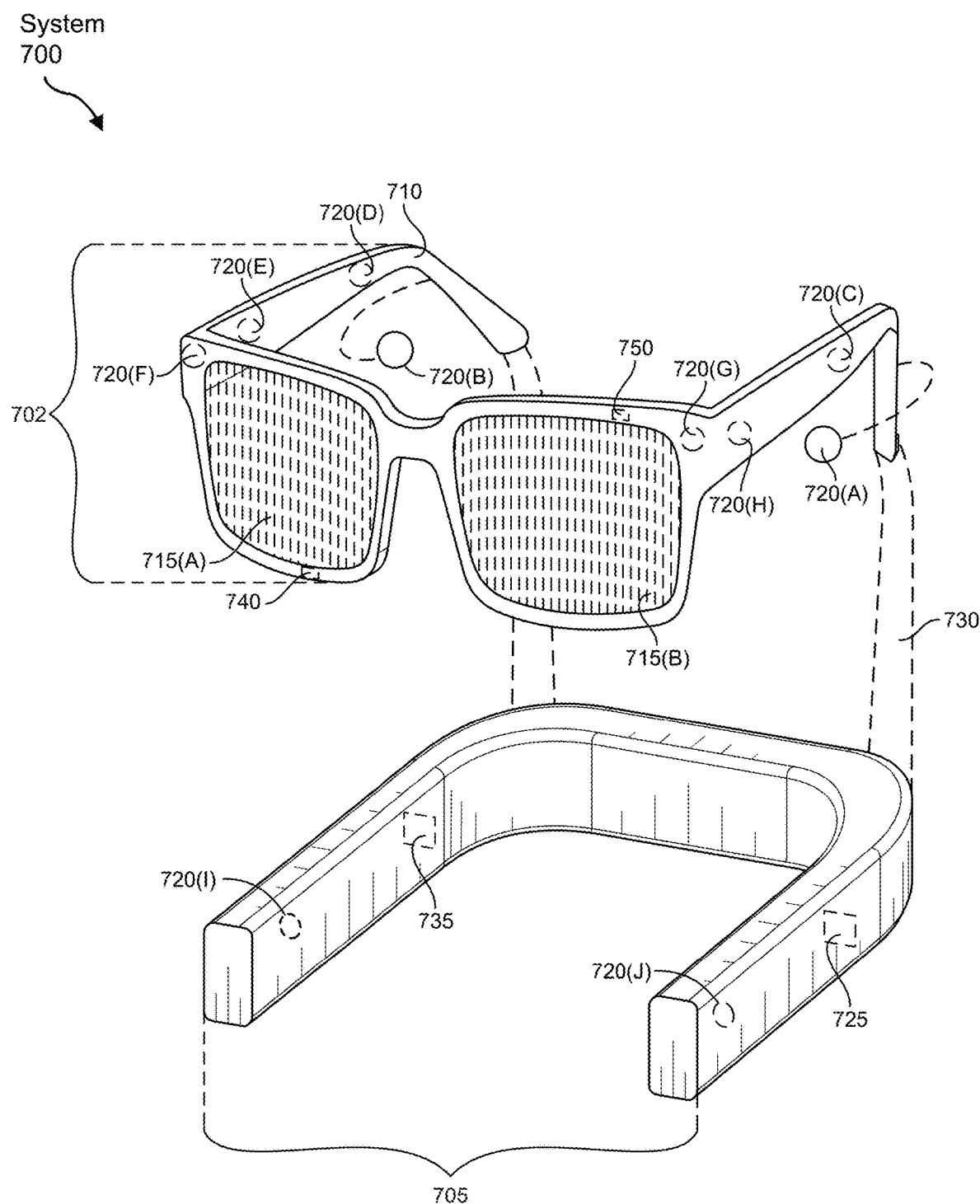
FIG. 7 is an illustration of exemplary augmented-reality glasses that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-720(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720 (A) and 720(B), which may be designed to be placed inside a corresponding ear of the user, acoustic transducers 720(C), 720(D), 720(E), 720(F), 720 (G), and 720(H), which may be positioned at various locations on frame 710, and/or acoustic transducers 720(I) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality system 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

FIG. 9 shows an example artificial-reality environment 900 including one head-mounted virtual-reality display and two wearable devices (i.e., gloves), and in other embodiments any number and/or combination of these components and other components may be included in an artificial-reality system. For example, in some embodiments there may be multiple head-mounted displays each having an associated wearable device, with each head-mounted display and each wearable device communicating with the same console, portable computing device, or other computing system.

Figure 8:
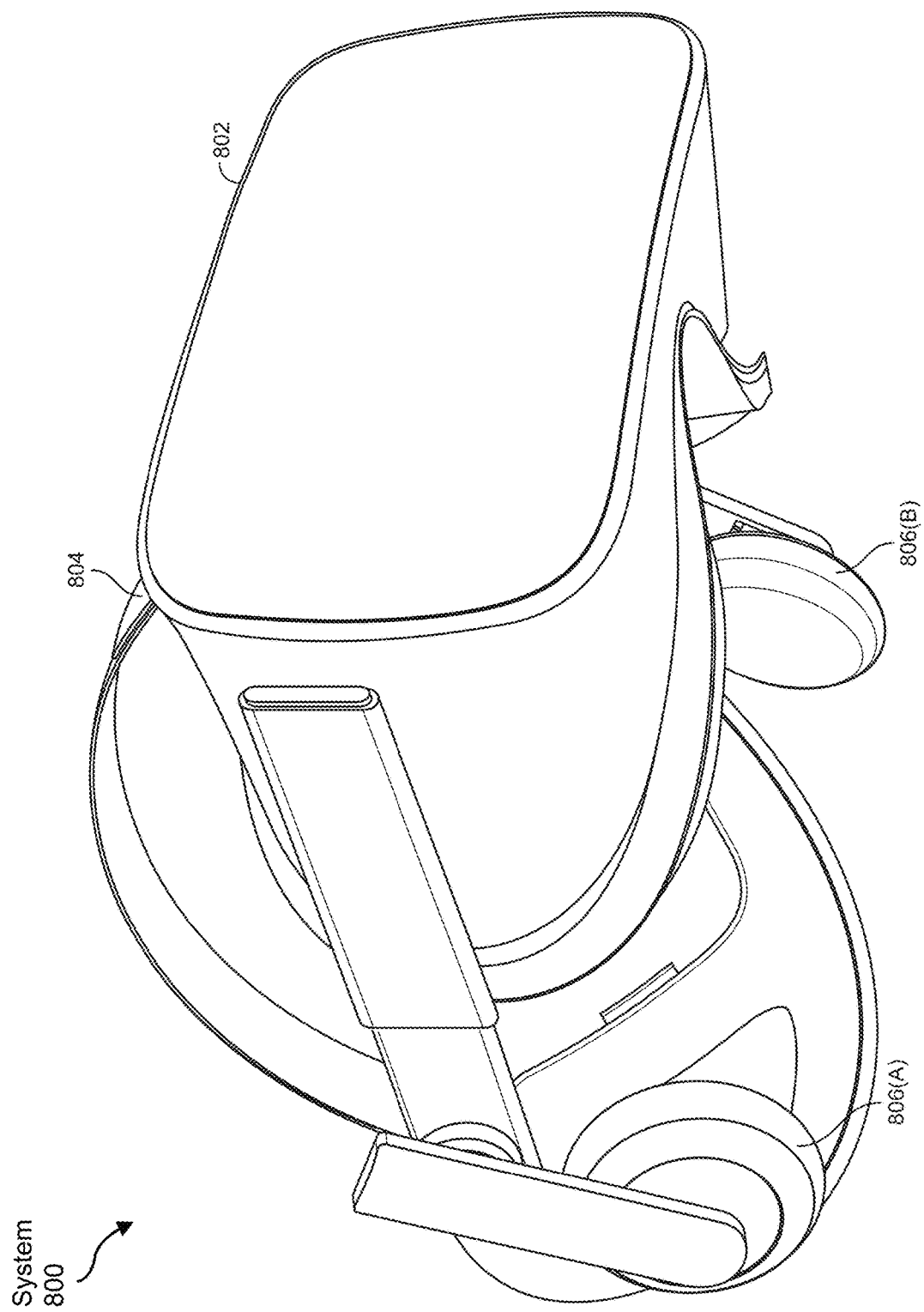
FIG. 8 is an illustration of an exemplary virtual-reality headset that may be used in connection with embodiments of this disclosure.

Head-mounted display 902 generally represents any type or form of virtual-reality system, such as virtual-reality system 800 in FIG. 8. Wearable device 904 generally represents any type or form of wearable device, worn by a user of an artificial-reality system, that enables the user to engage with a virtual object. In some embodiments, wearable device 904 may provide haptic feedback by applying vibration, motion, and/or force to the user. For example, wearable device 904 may limit or augment a user's movement. In some examples, a user may also use wearable device 904 to send action requests to a console. Examples of action requests include, without limitation, requests to start an application and/or end the application and/or requests to perform a particular action within the application.

While interfaces may be used with virtual-reality systems, as shown in FIG. 9, these interfaces may also be used with augmented-reality systems, as shown in FIG. 10. FIG. 10 is a perspective view of a user 1010 interacting with an augmented-reality system 1000. In this example, user 1010 may wear a pair of augmented-reality glasses 1020 that may have one or more displays 1022 and that are paired with a wearable device 1030. In this example, wearable device 1030 maybe a wristband that includes a plurality of band elements 1032 and a tensioning mechanism 1034 that connects band elements 1032 to one another.

Wearable devices 904 and 1030 may include any suitable number and/or type of transducer, sensor, and/or feedback mechanism. For example, wearable devices 904 and 1030 may include one or more mechanical transducers, piezoelectric transducers, and/or fluidic transducers for haptic feedback. Wearable devices 904 and 1030 may also include various combinations of different types and forms of transducers that work together or independently to enhance a user's artificial-reality experience. In one example, each of band elements 1032 of wearable device 1030 may include a vibrotactor (e.g., a vibrotactile actuator) configured to vibrate in unison or independently to provide one or more of various types of haptic sensations to a user.

In some embodiments, the systems described herein may also include an eye-tracking subsystem designed to identify and track various characteristics of a user's eye(s), such as the user's gaze direction. The phrase "eye tracking" may in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 11:
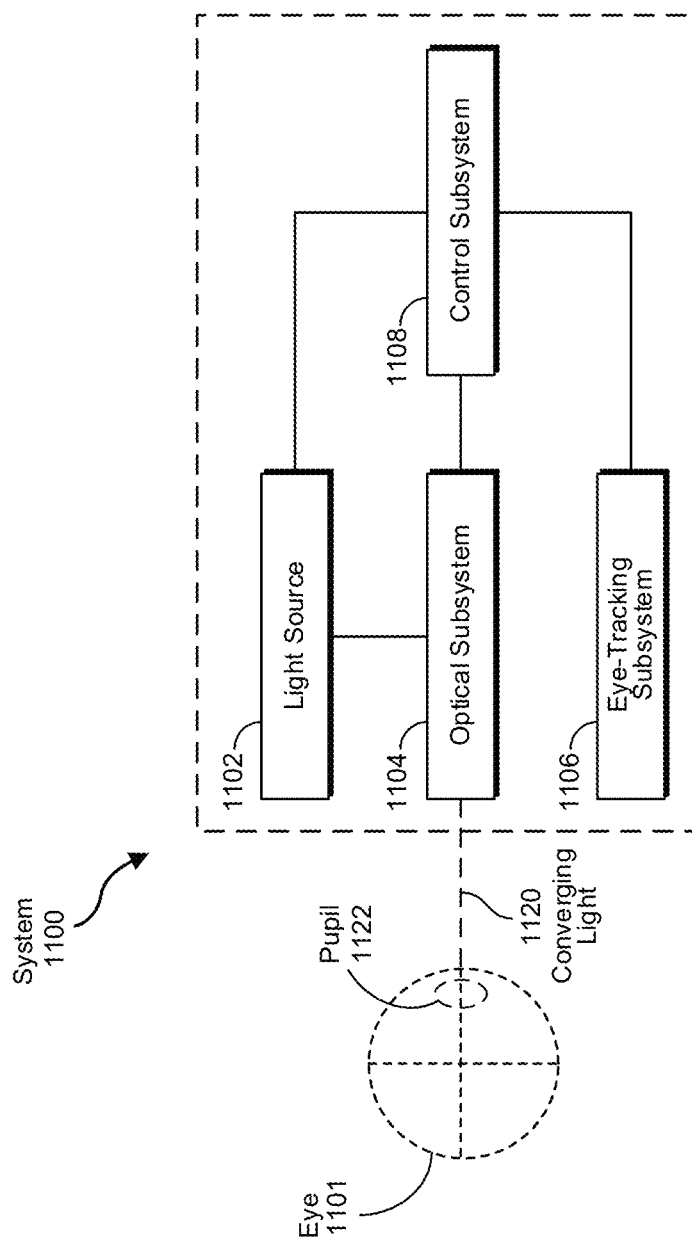
FIG. 11 an illustration of an exemplary system that incorporates an eye-tracking subsystem capable of tracking a user's eye(s).

FIG. 11 is an illustration of an exemplary system 1100 that incorporates an eye-tracking subsystem capable of tracking a user's eye(s). As depicted in FIG. 11, system 1100 may 1100 may include a light source 1102, an optical subsystem 1104, an eye-tracking subsystem 1106, and/or a control subsystem 1108. In some examples, light source 1102 may generate light for an image (e.g., to be presented to an eye 1101 of the viewer). Light source 1102 may represent any of a variety of suitable devices. For example, light source 1102 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1104 may receive the light generated by light source 1102 and generate, based on the received light, converging light 1120 that includes the image. In some examples, optical subsystem 1104 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1120. Further, various mechanical couplings may serve to maintain the relative spacing and/or the orientation of the optical components in any suitable combination.

In one embodiment, eye-tracking subsystem 1106 may generate tracking information indicating a gaze angle of an eye 1101 of the viewer. In this embodiment, control subsystem 1108 may control aspects of optical subsystem 1104 (e.g., the angle of incidence of converging light 1120) based at least in part on this tracking information. Additionally, in some examples, control subsystem 1108 may store and utilize historical tracking information (e.g., a history of the tracking information over a given duration, such as the previous second or fraction thereof) to anticipate the gaze angle of eye 1101 (e.g., an angle between the visual axis and the anatomical axis of eye 1101). In some embodiments, eye-tracking subsystem 1106 may detect radiation emanating from some portion of eye 1101 (e.g., the cornea, the iris, the pupil, or the like) to determine the current gaze angle of eye 1101. In other examples, eye-tracking subsystem 1106 may employ a wavefront sensor to track the current location of the pupil.

Any number of techniques can be used to track eye 1101. Some techniques may involve illuminating eye 1101 with infrared light and measuring reflections with at least one optical sensor that is tuned to be sensitive to the infrared light. Information about how the infrared light is reflected from eye 1101 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1106 may be digitized (i.e., converted to an electronic signal). Further, the sensor may transmit a digital representation of this electronic signal to one or more processors (for example, processors associated with a device including eye-tracking subsystem 1106). Eye-tracking subsystem 1106 may include any of a variety of sensors in a variety of different configurations. For example, eye-tracking subsystem 1106 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1106 to track the movement of eye 1101. In another example, these processors may track the movements of eye 1101 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1106 may be programmed to use an output of the sensor(s) to track movement of eye 1101. In some embodiments, eye-tracking subsystem 1106 may analyze the digital representation generated by the sensors to extract eye rotation information from changes in reflections. In one embodiment, eye-tracking subsystem 1106 may use corneal reflections or glints (also known as Purkinje images) and/or the center of the eye's pupil 1122 as features to track over time.

In some embodiments, eye-tracking subsystem 1106 may use the center of the eye's pupil 1122 and infrared or near-infrared, non-collimated light to create corneal reflections. In these embodiments, eye-tracking subsystem 1106 may use the vector between the center of the eye's pupil 1122 and the corneal reflections to compute the gaze direction of eye 1101. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1106 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1101 may act as a retroreflector as the light reflects off the retina, thereby creating a bright pupil effect similar to a red-eye effect in photography. If the illumination source is offset from the optical path, then the eye's pupil 1122 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1108 may control light source 1102 and/or optical subsystem 1104 to reduce optical aberrations (e.g., chromatic aberrations and/or monochromatic aberrations) of the image that may be caused by or influenced by eye 1101. In some examples, as mentioned above, control subsystem 1108 may use the tracking information from eye-tracking subsystem 1106 to perform such control. For example, in controlling light source 1102, control subsystem 1108 may alter the light generated by light source 1102 (e.g., by way of image rendering) to modify (e.g., pre-distort) the image so that the aberration of the image caused by eye 1101 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 12:
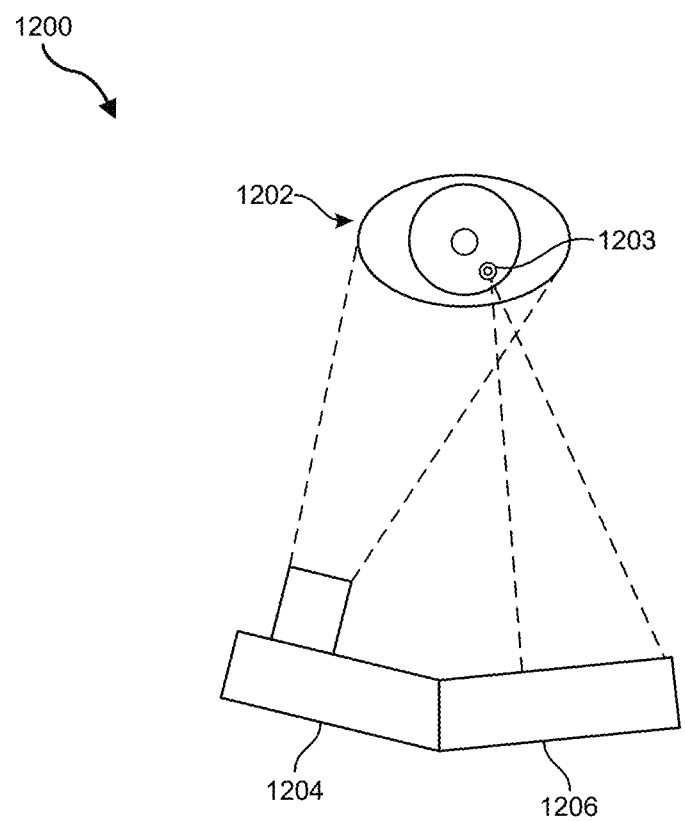
FIG. 12 is a more detailed illustration of various aspects of the eye-tracking subsystem illustrated in FIG. 11.
Figure 12:
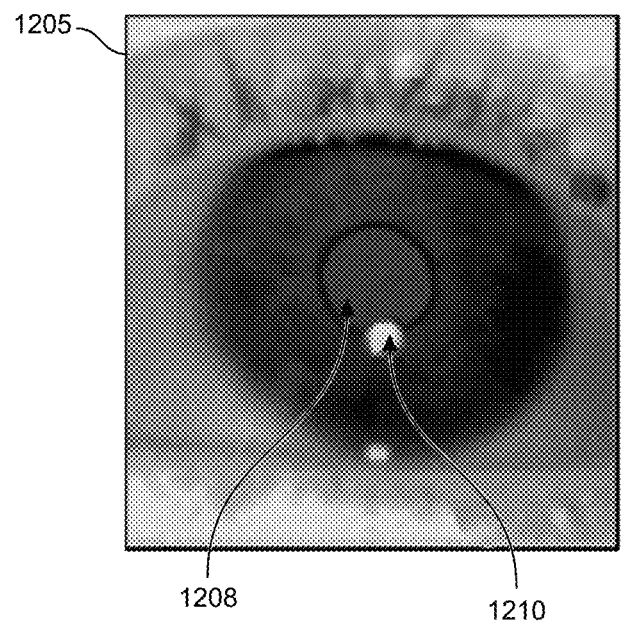

FIG. 12 is a more detailed illustration of various aspects of the eye-tracking subsystem illustrated in FIG. 11. As shown in this figure, an eye-tracking subsystem 1200 may include at least one source 1204 and at least one sensor 1206. Source 1204 generally represents any type or form of element capable of emitting radiation. In one example, source 1204 may generate visible, infrared, and/or near-infrared radiation. In some examples, source 1204 may radiate non-collimated infrared and/or near-infrared portions of the electromagnetic spectrum towards an eye 1202 of a user. Source 1204 may utilize a variety of sampling rates and speeds. For example, the disclosed systems may use sources with higher sampling rates in order to capture fixational eye movements of a user's eye 1202 and/or to correctly measure saccade dynamics of the user's eye 1202. As noted above, any type or form of eye-tracking technique may be used to track the user's eye 1202, including optical-based eye-tracking techniques, ultrasound-based eye-tracking techniques, etc.

Sensor 1206 generally represents any type or form of element capable of detecting radiation, such as radiation reflected off the user's eye 1202. Examples of sensor 1206 include, without limitation, a charge coupled device (CCD), a photodiode array, a complementary metal-oxide-semiconductor (CMOS) based sensor device, and/or the like. In one example, sensor 1206 may represent a sensor having predetermined parameters, including, but not limited to, a dynamic resolution range, linearity, and/or other characteristic selected and/or designed specifically for eye tracking.

As detailed above, eye-tracking subsystem 1200 may generate one or more glints. As detailed above, a glint 1203 may represent reflections of radiation (e.g., infrared radiation from an infrared source, such as source 1204) from the structure of the user's eye. In various embodiments, glint 1203 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 12 shows an example image 1205 captured by an eye-tracking subsystem, such as eye-tracking subsystem 1200. In this example, image 1205 may include both the user's pupil 1208 and a glint 1210 near the same. In some examples, pupil 1208 and/or glint 1210 may be identified using an artificial-intelligence-based algorithm, such as a computer-vision-based algorithm. In one embodiment, image 1205 may represent a single frame in a series of frames that may be analyzed continuously in order to track the eye 1202 of the user. Further, pupil 1208 and/or glint 1210 may be tracked over a period of time to determine a user's gaze.

In one example, eye-tracking subsystem 1200 may be configured to identify and measure the inter-pupillary distance (IPD) of a user. In some embodiments, eye-tracking subsystem 1200 may measure and/or calculate the IPD of the user while the user is wearing the artificial reality system. In these embodiments, eye-tracking subsystem 1200 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1100 and/or eye-tracking subsystem 1200 may be incorporated into augmented-reality system 700 in FIG. 7 and/or virtual-reality system 800 in FIG. 8 to enable these systems to perform various eye-tracking tasks (including one or more of the eye-tracking operations described herein).

Figure 13A:
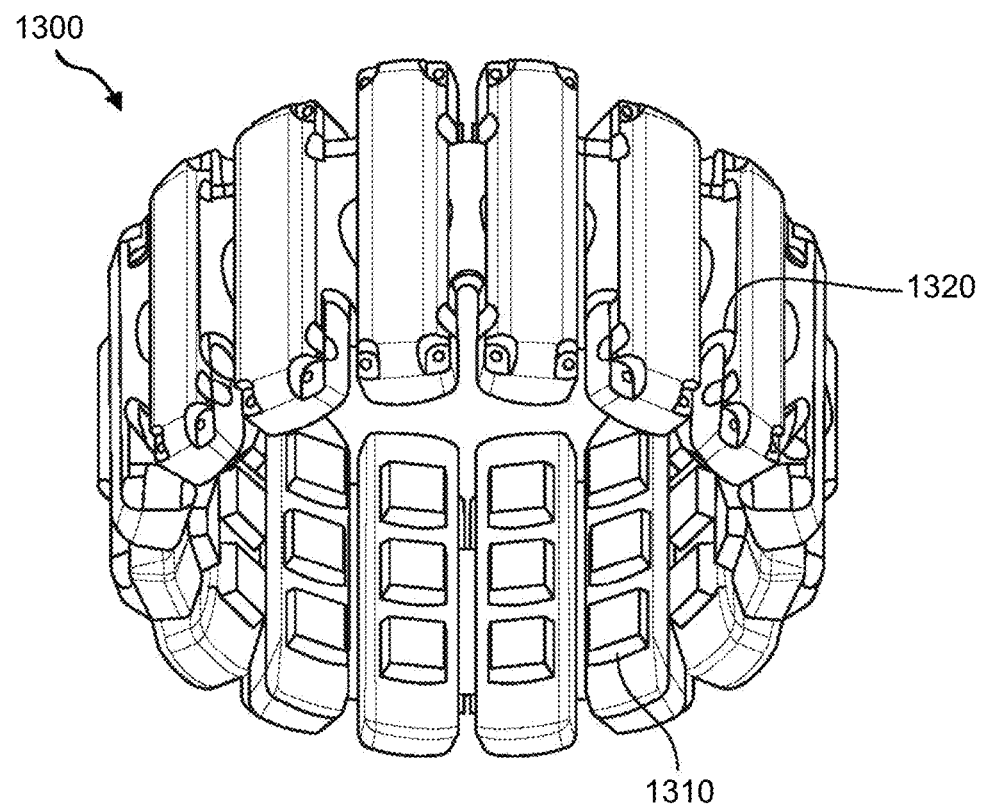
FIGS. 13A and 13B are illustrations of an exemplary human-machine interface configured to be worn around a user's lower arm or wrist.
Figure 13B:
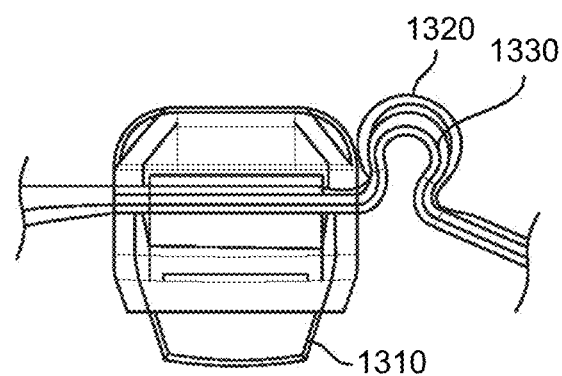

FIG. 13A illustrates an exemplary human-machine interface (also referred to herein as an EMG control interface) configured to be worn around a user's lower arm or wrist as a wearable system 1300. In this example, wearable system 1300 may include sixteen neuromuscular sensors 1310 (e.g., EMG sensors) arranged circumferentially around an elastic band 1320 with an interior surface 1330 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 13B illustrates a cross-sectional view through one of the sensors of the wearable device shown in FIG. 13A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1310 is discussed in more detail below with reference to FIGS. 14A and 14B.

Figure 14A:
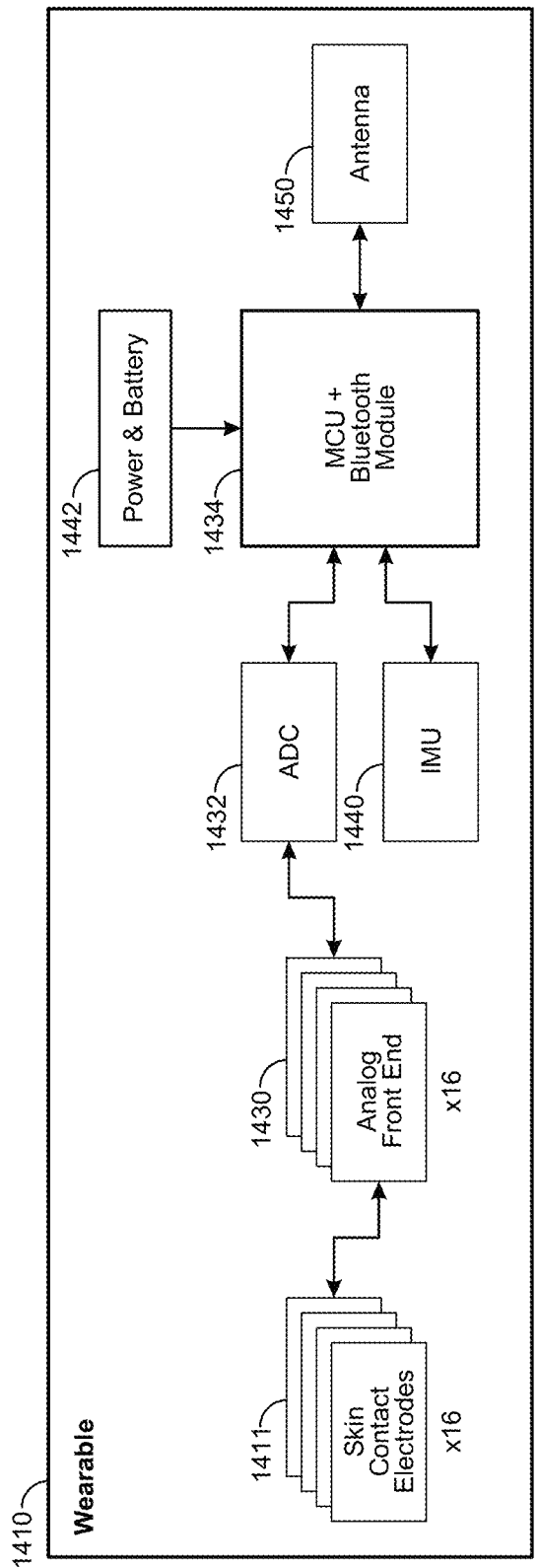
FIGS. 14A and 14B are illustrations of an exemplary schematic diagram with internal components of a wearable system.
Figure 14B:
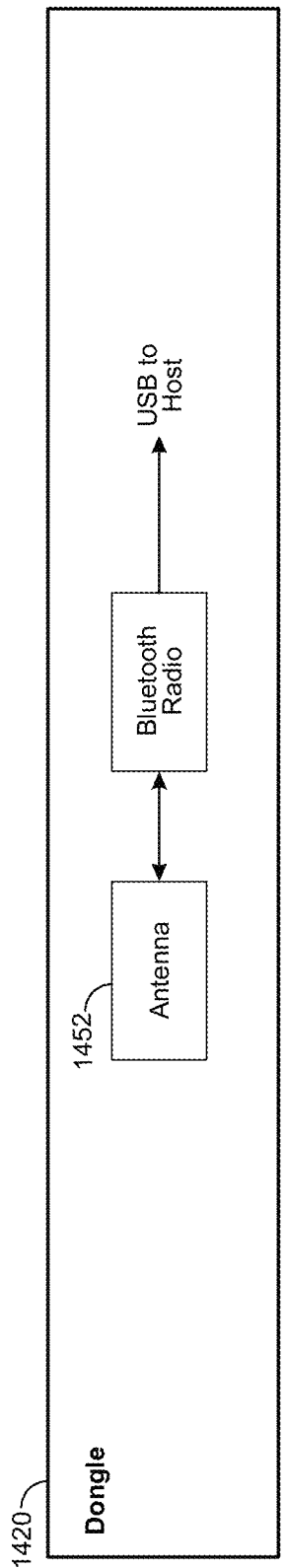

FIGS. 14A and 14B illustrate an exemplary schematic diagram with internal components of a wearable system with EMG sensors. As shown, the wearable system may include a wearable portion 1410 (FIG. 14A) and a dongle portion 1420 (FIG. 14B) in communication with the wearable portion 1410 (e.g., via BLUETOOTH or another suitable wireless communication technology). As shown in FIG. 14A, the wearable portion 1410 may 1410 may include skin contact electrodes 1411, examples of which are described in connection with FIGS. 13A and 13B. The output of the skin contact electrodes 1411 may be provided to analog front end 1430, which may be configured to perform analog processing (e.g., amplification, noise reduction, filtering, etc.) on the recorded signals. The processed analog signals may then be provided to analog-to-digital converter 1432, which may convert the analog signals to digital signals that can be processed by one or more computer processors. An example of a computer processor that may be used in accordance with some embodiments is microcontroller (MCU) 1434, illustrated in FIG. 14A. As shown, MCU 1434 may also include inputs from other sensors (e.g., IMU sensor 1440), and power and battery module 1442. The output of the processing performed by MCU 1434 may be provided to antenna 1450 for transmission to dongle portion 1420 shown in FIG. 14B.

Dongle portion 1420 may include antenna 1452, which may be configured to communicate with antenna 1450 included as part of wearable portion 1410. Communication between antennas 1450 and 1452 may occur using any suitable wireless technology and protocol, non-limiting examples of which include radiofrequency signaling and BLUETOOTH. As shown, the signals received by antenna 1452 of dongle portion 1420 may be provided to a host computer for further processing, display, and/or for effecting control of a particular physical or virtual object or objects.

Although the examples provided with reference to FIGS. 13A-13B and FIGS. 14A-14B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive eye gaze tracking data to be transformed, transform the eye gaze tracking data into a gaze position, output a result of the transformation to determine a fixation position, use the result of the transformation to speed up a cursor movement, and store the result of the transformation to maintain a cursor trajectory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    capturing, by a computing device, a current position of a wearable device and a current position of user eye gaze at a current time;
    determining, by the computing device, that a user eye gaze is at a fixation position based on a speed of gaze movement;
    calculating, by the computing device, a direction of cursor movement by comparing a current cursor position with a previous cursor position at a previous time, wherein a cursor position is determined relative to a position of the wearable device;
    calculating, by the computing device, a likelihood of the fixation position being a target cursor position based on a difference between the direction of cursor movement and a direction from the current cursor position to the fixation position; and
    increasing, by the computing device, a speed of cursor movement toward the fixation position based on the likelihood.

2. The method of claim 1, wherein capturing the current position of the wearable device comprises receiving a set of coordinates of the wearable device at periodic intervals.

3. The method of claim 1, wherein the fixation position indicates a key on a virtual keyboard.

4. The method of claim 3, further comprising:
    determining the current position of user eye gaze is more than a size of the key away from a previous fixation position; and
    detecting a new fixation position based on the current position of user eye gaze.

5. The method of claim 4, further comprising:
    determining the current position of user eye gaze is outside a range of the virtual keyboard;
    discarding the current position of user eye gaze; and
    setting the fixation position to the previous fixation position.

6. The method of claim 1, wherein the speed of gaze movement is calculated by comparing the current position of user eye gaze to a previous position of user eye gaze at the previous time.

7. The method of claim 1, wherein determining that the user eye gaze is at the fixation position comprises:
    determining that the speed of gaze movement is below a predetermined threshold;
    determining that the speed of gaze movement remains below the predetermined threshold for a predetermined period of time; and
    setting the fixation position to the current position of user eye gaze.

8. The method of claim 7, further comprising:
    determining that the user eye gaze is in a saccade state based on determining that the speed of gaze movement is not below the predetermined threshold; and
    maintaining the fixation position until a new fixation position is detected.

9. The method of claim 1, wherein the speed of cursor movement is calculated by comparing the current cursor position to the previous cursor position at the previous time.

10. The method of claim 1, further comprising decreasing the speed of cursor movement relative to a decrease in a distance between the current cursor position and the fixation position.

11. The method of claim 1, further comprising:
    determining the current cursor position is within a predetermined proximity of the fixation position; and
    reducing the speed of cursor movement to a base cursor speed.

12. The method of claim 1, further comprising:
    generating a list of suggested words based on a set of recent fixation positions;
    displaying the list of suggested words in a virtual environment; and
    detecting a selection of a suggested word.

13. A system comprising:
    a capturing module, stored in memory, that captures, by a computing device, a current position of a wearable device and a current position of user eye gaze at a current time;
    a determination module, stored in memory, that determines, by the computing device, that a user eye gaze is at a fixation position based on a speed of gaze movement;
    a direction module, stored in memory, that calculates, by the computing device, a direction of cursor movement by comparing a current cursor position with a previous cursor position at a previous time, wherein a cursor position is determined relative to a position of the wearable device;
    a calculation module, stored in memory, that calculates, by the computing device, a likelihood of the fixation position being a target cursor position based on a difference between the direction of cursor movement and a direction from the current cursor position to the fixation position;
    a movement module, stored in memory, that increases, by the computing device, a speed of cursor movement toward the fixation position based on the likelihood; and
    at least one processor that executes the capturing module, the determination module, the direction module, the calculation module, and the movement module.

14. The system of claim 13, wherein the capturing module captures the current position of the wearable device by receiving a set of coordinates of the wearable device at periodic intervals.

15. The system of claim 13, wherein the fixation position indicates a key on a virtual keyboard.

16. The system of claim 15, wherein the determination module further:
  determines the current position of user eye gaze is more than a size of the key away from a previous fixation position; and
  detects a new fixation position based on the current position of user eye gaze.

17. The system of claim 16, wherein the determination module further:
  determines the current position of user eye gaze is outside a range of the virtual keyboard;
  discards the current position of user eye gaze; and
  sets the fixation position to the previous fixation position.

18. The system of claim 13, wherein the speed of gaze movement is calculated by comparing the current position of user eye gaze to a previous position of user eye gaze at the previous time.

19. The system of claim 13, wherein the determination module determines that the user eye gaze is at the fixation position by:
  determining that the speed of gaze movement is below a predetermined threshold;
  determining that the speed of gaze movement remains below the predetermined threshold for a predetermined period of time; and
  setting the fixation position to the current position of user eye gaze.

20. A non-transitory computer-readable medium comprising one or more computer-executable instructions that, when executed by at least one processor of a computing device, cause the computing device to:
  capture a current position of a wearable device and a current position of user eye gaze at a current time;
  determine that a user eye gaze is at a fixation position based on a speed of gaze movement;
  calculate a direction of cursor movement by comparing a current cursor position with a previous cursor position at a previous time, wherein a cursor position is determined relative to a position of the wearable device;
  calculate a likelihood of the fixation position being a target cursor position based on a difference between the direction of cursor movement and a direction from the current cursor position to the fixation position; and
  increase a speed of cursor movement toward the fixation position based on the likelihood.

* * * * *